US012738410B2

(12) United States Patent
Yen et al.

(10) Patent No.: US 12,738,410 B2
(45) Date of Patent: Sep. 15, 2026

(54) TRANSFORMER DEVICE

(71) Applicant: Realtek Semiconductor Corporation, Hsinchu (TW)

(72) Inventors: Hsiao-Tsung Yen, Hsinchu (TW); Kuan-Yu Shih, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 966 days.

(21) Appl. No.: 17/934,569

(22) Filed: Sep. 22, 2022

(65) Prior Publication Data

US 2023/0102026 A1 Mar. 30, 2023

(30) Foreign Application Priority Data

Sep. 29, 2021 (TW) ................................ 110136307

(51) Int. Cl.
*H01F 27/28* (2006.01)

(52) U.S. Cl.
CPC . *H01F 27/2804* (2013.01); *H01F 2027/2809* (2013.01)

(58) Field of Classification Search
CPC ......... H01F 27/2804; H01F 2027/2809; H01F 17/0006; H01F 17/0013; H01F 5/003
USPC .................................................. 336/200, 232
See application file for complete search history.

(56) References Cited

U.S. PATENT DOCUMENTS

| | | | | |
|---|---|---|---|---|
| 2010/0060402 | A1* | 3/2010 | Chen | H03H 7/422 336/200 |
| 2010/0164667 | A1* | 7/2010 | Ho-Hsiang | H01F 27/34 336/200 |
| 2015/0310980 | A1* | 10/2015 | Yen | H01F 5/00 336/200 |
| 2019/0237238 | A1* | 8/2019 | Yen | H01F 19/04 |
| 2021/0202156 | A1 | 7/2021 | Yen et al. | |
| 2021/0304953 | A1 | 9/2021 | Yen et al. | |

FOREIGN PATENT DOCUMENTS

| | | | | |
|---|---|---|---|---|
| CN | 108022913 A | | 5/2018 | |
| TW | I699791 B | * | 7/2020 | H01F 17/0013 |

OTHER PUBLICATIONS

The office action of corresponding CN application No. 202111191913.2 issued on Dec. 20, 2025.

* cited by examiner

*Primary Examiner* — Tszfung J Chan
(74) *Attorney, Agent, or Firm* — CKC & Partners Co., LLC

(57) ABSTRACT

A transformer device includes a first trace and a second trace. The first trace includes at least one first sub-trace. The at least one first sub-trace is located on a first layer. The second trace includes at least one second sub-trace and a third sub-trace. The at least one second sub-trace is located on the first layer, and disposed adjacent to the least one first sub-trace. The third sub-trace is located on a second layer, and overlaps the at least one first sub-trace partially.

9 Claims, 3 Drawing Sheets

TRANSFORMER DEVICE

RELATED APPLICATIONS

This application claims priority to and the benefit of Taiwan Application Serial Number 110136307, filed on Sep. 29, 2021, the entire contents of which are incorporated herein by reference as if fully set forth below in its entirety and for all applicable purposes.

BACKGROUND

Field of Invention

The present disclosure relates to an integrated device. More particularly, the present disclosure relates to a transformer device of an integrated device.

Description of Related Art

The various types of transformers according to the prior art have their advantages and disadvantages. For example, inductance density of a transformer, having crossing structure, is low. In addition, Q value of stack-typed transformer is low. Therefore, the scopes of application of the above transformers are limited.

SUMMARY

The foregoing presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

One aspect of the present disclosure is to provide a transformer device. The transformer device comprises a first trace and a second trace. The first trace, comprises at least one first sub-trace. The second trace comprises at least one second sub-trace and a third sub-trace. The at least one first sub-trace is located on a first layer. The at least one second sub-trace is located on the first layer, and disposed adjacent to the at least one first sub-trace. The third sub-trace is located on a second layer, and overlapped with the at least one first sub-trace partially.

Therefore, based on the technical content of the present disclosure, the partial overlapped structures of the sub-traces of the transformer device enhance the inductance of the entire device. In addition, the quality factor of the entire device increases. Besides, since the structure of the transformer device of the present disclosure is extremely symmetric, the K factor of the entire device enhances.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

According to the usual mode of operation, various features and elements in the figures have not been drawn to scale, which are drawn to the best way to present specific features and elements related to the disclosure. In addition, among the different figures, the same or similar element symbols refer to similar elements/components.

DESCRIPTION OF THE EMBODIMENTS

To make the contents of the present disclosure more thorough and complete, the following illustrative description is given with regard to the implementation aspects and embodiments of the present disclosure, which is not intended to limit the scope of the present disclosure. The features of the embodiments and the steps of the method and their sequences that constitute and implement the embodiments are described. However, other embodiments may be used to achieve the same or equivalent functions and step sequences.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Furthermore, as used herein and in the claims, the singular forms "a" and "an" include the plural reference unless the context clearly indicates otherwise.

Figure 1:
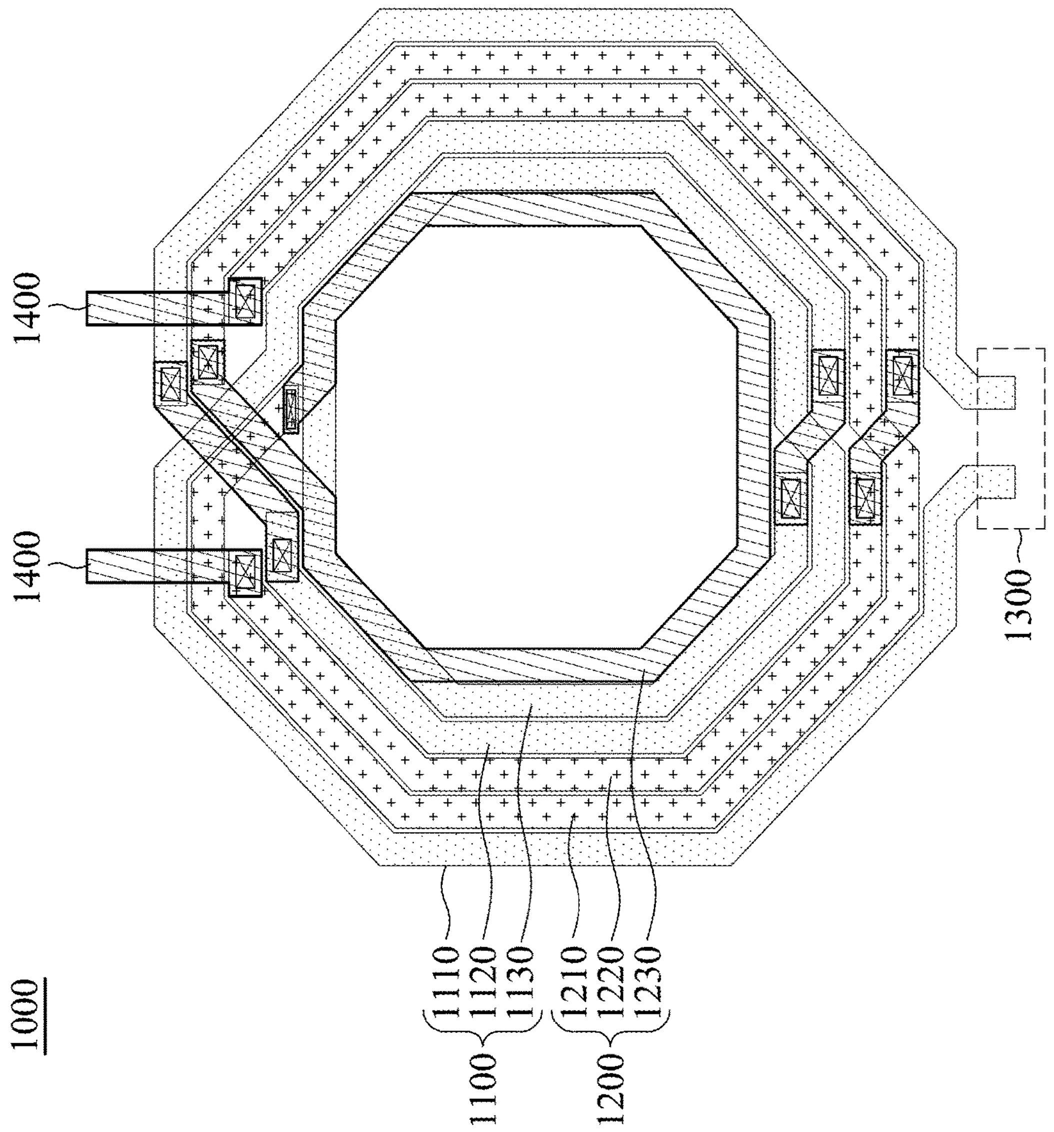
FIG. 1 depicts a schematic diagram of a transformer device according to one embodiment of the present disclosure.

FIG. 1 depicts a schematic diagram of a transformer device 1000 according to one embodiment of the present disclosure. As shown in the figure, the transformer device 1000 includes a first trace 1100 and a second trace 1200. The first trace 1100 includes at least one first sub-trace (e.g. the first sub-traces 1110, 1120, 1130). The second trace 1200 includes at least one second sub-trace (e.g. the second sub-traces 1210, 1220) and a third sub-trace 1230.

With respect to the structure, the at least one first sub-trace (e.g. the first sub-traces 1110, 1120, 1130) is located on a first layer. The at least one second sub-trace (e.g. the second sub-traces 1210, 1220) is located on the first layer, and disposed adjacent to the at least one first sub-trace (e.g. the first sub-traces 1110, 1120, 1130). Besides, the third sub-trace 1230 is located on a second layer, and overlaps with the at least one first sub-trace (e.g. the first sub-traces 1110, 1120, 1130) partially.

As described above, the partial overlapped structures of the at least one first sub-trace (e.g. the first sub-traces 1110, 1120, 1130) and the third sub-trace 1230 enhance the inductance of the entire device. Besides, the quality factor of the entire device increases. In addition, since the structure of the transformer device of the present disclosure is extremely symmetric, the K factor of the entire device enhances.

In one embodiment, the third sub-trace 1230 is located at an inner side of the second trace 1200, and overlaps with the at least one first sub-trace (e.g. the first sub-traces 1110, 1120, 1130) which is located at an inner side of the first trace 1100 partially. Furthermore, the third sub-trace 1230 is located at an innermost side of the second trace 1200. The at least one first sub-trace includes a plurality of first sub-traces 1110, 1120, 1130, and the third sub-trace 1230 overlaps with the first sub-trace 1130 which is located at an innermost side of the first sub-traces 1110, 1120, 1130 partially.

In one embodiment, the at least one second sub-trace includes a plurality of second sub-traces 1210, 1220, and a disposition sequence of the first sub-traces 1110, 1120, 1130 and the second sub-traces 1210, 1220 is that the first sub-trace 1110, the second sub-trace 1210, the second sub-trace 1220, the first sub-trace 1120, and the first sub-trace 1130. Besides, as shown in the figure, the second sub-trace 1210 and the second sub-trace 1220 are adjacent to each other directly, and the first sub-trace 1120 and the first sub-trace 1130 are adjacent to each other directly.

In one embodiment, the transformer device 1000 further includes a first input/output member 1300. The first input/output member 1300 is located on the first layer, and coupled to the first sub-traces 1110, 1120, 1130 of the first trace 1100. Furthermore, the first input/output member 1300 is coupled to one of the first sub-traces 1110, 1120, 1130 which is located at an outer side of the first trace 1100. Specifically, the first input/output member 1300 is coupled to the first sub-trace 1110 which is located at an outermost side.

In one embodiment, the transformer device 1000 further includes a second input/output member 1400. The second input/output member 1400 is located on the second layer, and coupled to the second sub-traces 1210, 1220 of the second trace 1200. Furthermore, the second input/output member 1400 is coupled to the second sub-traces 1210, 1220 which is located at an inner side of the second trace 1200, and the second input/output member 1400 crosses the second sub-traces 1210, 1220 of the second trace 1200. Specifically, the second input/output member 1400 is coupled to the second sub-trace 1220 which is located at an innermost side, and the first input/output member 1300 are the second input/output member 1400 are disposed at two sides of the transformer device 1000 (e.g. the upper side and the lower side of the transformer device 1000) respectively.

In one embodiment, the first sub-traces 1110, 1120, 1130, the second sub-traces 1210, 1220, and the first input/output member 1300 are located on the first layer. Besides, the third sub-trace 1230 and the second input/output member 1400 are located on the second layer. In addition, the first layer is different from the second layer. However, the present disclosure is not limited to the structure as shown in FIG. 1, and it is merely an example for illustrating one of the implements of the present disclosure.

Figure 2:
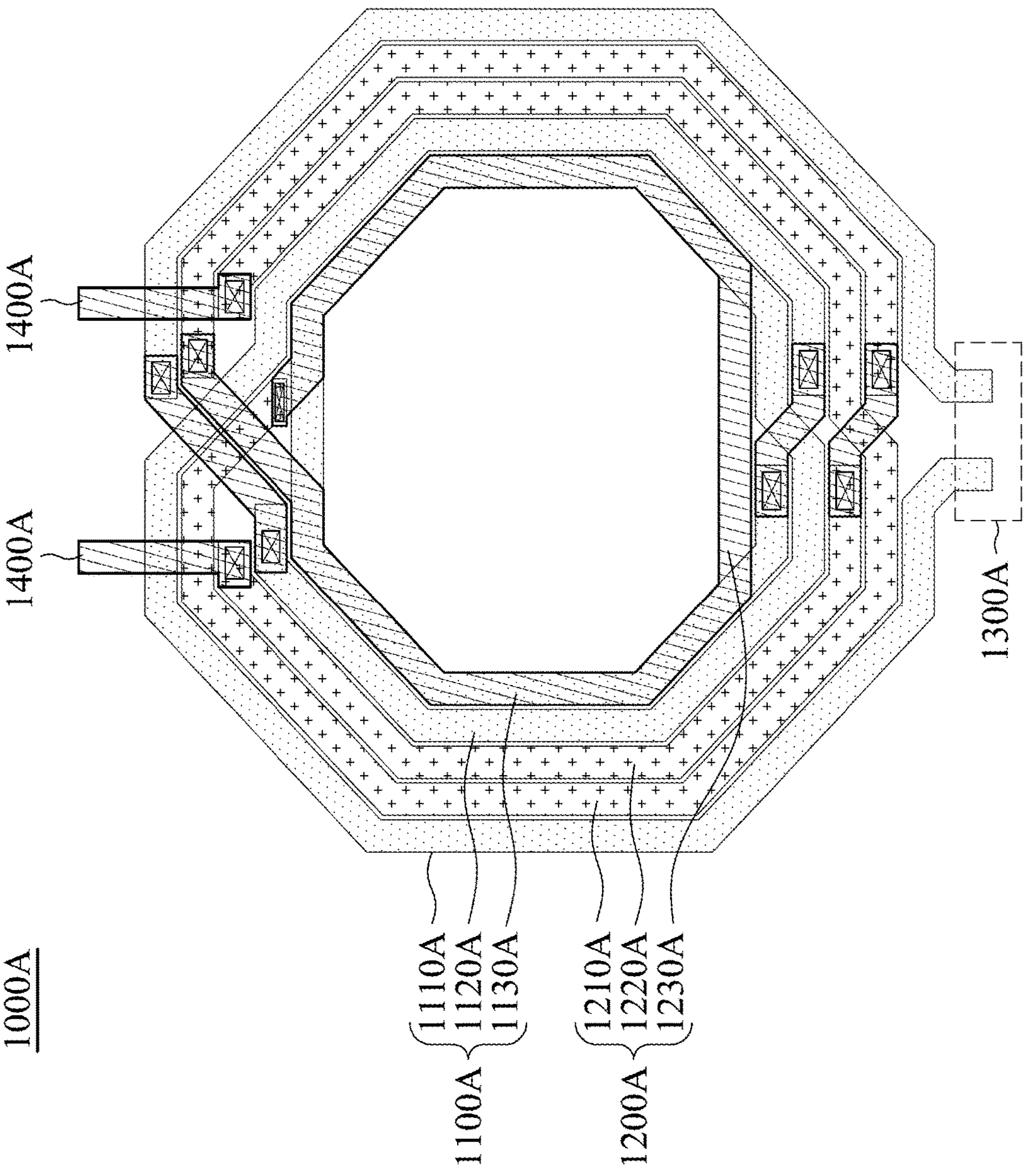
FIG. 2 depicts a schematic diagram of a transformer device according to one embodiment of the present disclosure.

FIG. 2 depicts a schematic diagram of a transformer device 1000A according to one embodiment of the present disclosure. Compared with the transformer device 1000 in FIG. 1, the disposition of the third sub-trace 1230A of the transformer device 1000A in FIG. 2 is different, which will be described in detail as shown below.

As shown in the figure, the third sub-trace 1230A and the at least one first sub-trace (e.g. the first sub-traces 1110A, 1120A, 1130A) of the first trace 1100A overlap to each other completely. For example, the third sub-trace 1230A is located at an inner side of the second trace 1200A, and overlaps with the at least one first sub-trace (e.g. the first sub-traces 1110A, 1120A, 1130A) which is located at an inner side of the first trace 1100A completely. Furthermore, the third sub-trace 1230A is located on an innermost side of the second trace 1200A. The at least one first sub-trace includes a plurality of first sub-traces 1110A, 1120A, 1130A, and the third sub-trace 1230A overlaps with the first sub-trace 1130A which is located at an innermost side of the first sub-traces 1110A, 1120A, 1130A completely. It is noted that, the first sub-traces 1120A, 1130A are coupled to each other to form a crossing at the lower side of FIG. 2, and the crossing needs two layers. Therefore, besides the crossing, the third sub-trace 1230A overlaps with the first sub-trace 1130A completely.

In one embodiment, the at least one second sub-trace includes a plurality of second sub-traces 1210A, 1220A. A disposition sequence of the first sub-traces 1110A, 1120A, 1130A, and the second sub-traces 1210A, 1220A is that the first sub-trace 1110A, the second sub-trace 1210A, the second sub-trace 1220A, the first sub-trace 1120A, and the first sub-trace 1130A. Besides, as shown in the figure, the second sub-trace 1210A and the second sub-trace 1220A are coupled to each other directly, and the first sub-trace 1120A and the first sub-trace 1130A are coupled to each other directly.

In one embodiment, the transformer device 1000A further includes a first input/output member 1300A. The first input/output member 1300A is located on the first layer, and coupled to the first sub-traces 1110A, 1120A, 1130A of the first trace 1100A. Furthermore, the first input/output member 1300A is coupled to one of the first sub-traces 1110A, 1120A, 1130A which is located on an outer side of the first trace 1100A. Specifically, the first input/output member 1300A is coupled to the first sub-trace 1110A which is located at an outermost side.

In one embodiment, the transformer device 1000A further includes a second input/output member 1400A. The second input/output member 1400A is located on the second layer, and coupled to the second sub-traces 1210A, 1220A of the second trace 1200A. Furthermore, the second input/output member 1400A is coupled to one of the second sub-traces 1210A, 1220A which is located at an inner side of the second trace 1200A, and the second input/output member 1400A crosses the second sub-traces 1210A, 1220A of the second trace 1200A. Specifically, the second input/output member 1400A is coupled to the second sub-trace 1220A which is located at an innermost side, and the first input/output member 1300A and the second input/output member 1400A are disposed at two sides of the transformer device 1000A (e.g. the upper side and the lower side of the transformer device 1000A) respectively.

In one embodiment, the first sub-traces 1110A, 1120A, 1130A, the second sub-traces 1210A, 1220A, and the first input/output member 1300A are located on the first layer. Besides, the third sub-trace 1230A and the second input/output member 1400A are located on the second layer. In addition, the first layer is different from the second layer. However, the present disclosure is not limited to the structure as shown in FIG. 2, and it is merely an example for illustrating one of the implements of the present disclosure.

Figure 3:
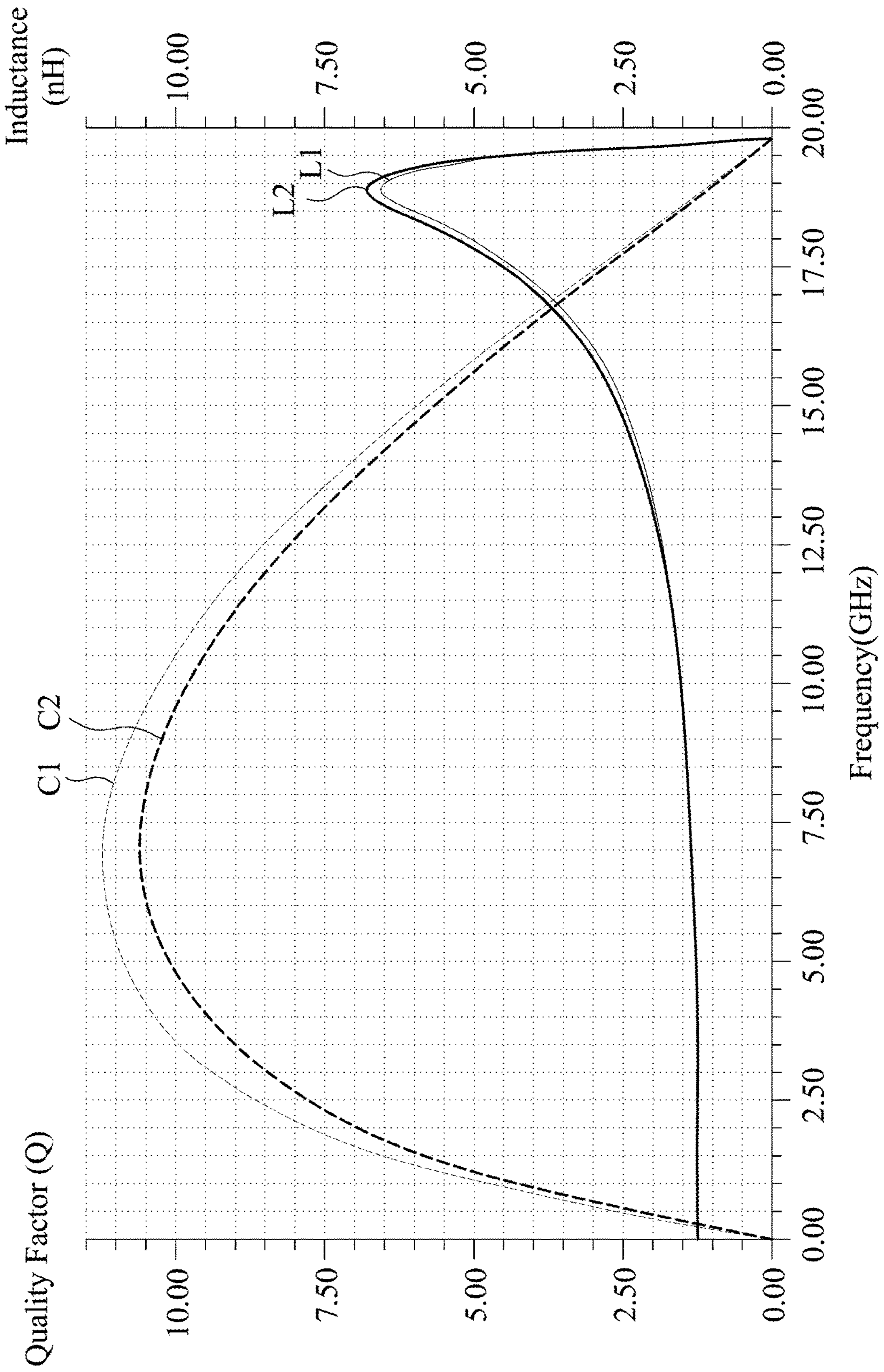
FIG. 3 depicts a schematic diagram of experimental data of a transformer device according to one embodiment of the present disclosure.

FIG. 3 depicts a schematic diagram of experimental data of a transformer device according to one embodiment of the present disclosure. As shown in the figure, the experimental curve of the quality factor of the first traces 1100, 1100A of the transformer devices 1000, 1000A adopting the structural configuration of the present disclosure is C1, and the experimental curve of the inductance value of the first traces 1100, 1100A is L1. Besides, the experimental curve of the quality factor of the second traces 1200, 1200A of the transformer devices 1000, 1000A adopting the structural configuration of the present disclosure is C2, and the experimental curve of the inductance value of the second traces 1200, 1200A is L2. As can be seen from the figure, at a frequency of about 5 GHz, the quality factor of the first traces 1100, 1100A is about 11, and the quality factor of the second traces 1200,

1200A is about 10.3. Besides, the inductance of the first traces 1100, 1100A and the second trace 1200, 1200A is about 1.34 nH. However, the present disclosure is not limited to the structure as shown in FIG. 3, and it is merely an example for illustrating one of the implements of the present disclosure.

It can be understood from the embodiments of the present disclosure that application of the present disclosure has the following advantages. The partial overlapped structures of the sub-traces of the transformer device enhance the inductance of the entire device. In addition, the quality factor of the entire device increases. Besides, since the structure of the transformer device of the present disclosure is extremely symmetric, the K factor of the entire device enhances.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A transformer device, comprising:

a first trace, comprising:

at least one first sub-trace, located on a first layer, wherein the at least one first sub-trace comprises a plurality of first sub-traces;

a second trace, comprising:

at least one second sub-trace, located on the first layer, and disposed adjacent to the at least one first sub-trace, wherein the at least one second sub-trace comprises a plurality of second sub-traces; and a third sub-trace, located on a second layer, and overlapped with the at least one first sub-trace partially, a first input/output member, located on the first layer, and coupled to the first sub-trace which is located at an outermost side of the first sub-traces; and a second input/output member, located on the second layer, coupled to the second sub-trace which is located at an innermost side of the second sub-traces, crosses the second sub-traces, and further crosses only one of the first sub-traces.

2. The transformer device of claim 1, wherein the third sub-trace is located at an inner side of the second trace, and overlaps with the at least one first sub-trace which is located at an inner side of the first trace partially.

3. The transformer device of claim 2, wherein the third sub-trace is located at an innermost side of the second trace, wherein the third sub-trace overlaps with the first sub-trace which is located at an innermost side of the first sub-traces partially.

4. The transformer device of claim 3, wherein the first sub-traces comprise an outermost first sub-trace, a middle first sub-trace and an innermost first sub-trace, the second sub-traces comprise an outermost second sub-trace and an innermost second sub-trace, and a disposition sequence of the first sub-traces and the second sub-traces from an outer side to an inner side of the transformer device is that the outermost first sub-trace, the outermost second sub-trace, the innermost second sub-trace, the middle first sub-trace, and the innermost first sub-trace.

5. The transformer device of claim 1, wherein the first input/output member and the second input/output member are disposed at two sides of the transformer device respectively.

6. The transformer device of claim 1, wherein the third sub-trace and the at least one first sub-trace overlap with each other completely.

7. The transformer device of claim 6, wherein the third sub-trace is located at an inner side of the second trace, and overlaps with the at least one first sub-trace which is located at an inner side of the first trace completely.

8. The transformer device of claim 7, wherein the third sub-trace is located on an innermost side of the second trace, wherein the third sub-trace overlaps with the first sub-trace which is located at an innermost side of the first sub-traces completely.

9. The transformer device of claim 8, wherein the first sub-traces comprise an outermost first sub-trace, a middle first sub-trace and an innermost first sub-trace, the second sub-traces comprise an outermost second sub-trace and an innermost second sub-trace, and a disposition sequence of the first sub-traces and the second sub-traces from an outer side to an inner side of the transformer device is that the outermost first sub-trace, the outermost second sub-trace, the innermost second sub-trace, the middle first sub-trace, and the innermost first sub-trace.

* * * * *